(12) United States Patent
Hodgson et al.

(10) Patent No.: US 8,273,301 B2
(45) Date of Patent: Sep. 25, 2012

(54) EXHAUST-GAS TREATMENT DEVICE HAVING A SENSOR FOIL

(75) Inventors: Jan Hodgson, Troisdorf (DE); Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 367 days.

(21) Appl. No.: 12/578,478

(22) Filed: Oct. 13, 2009

(65) Prior Publication Data

US 2010/0089036 A1 Apr. 15, 2010

(30) Foreign Application Priority Data

Oct. 10, 2008 (DE) .......................... 10 2008 051 169

(51) Int. Cl.
*F01N 3/10* (2006.01)
(52) U.S. Cl. ....................................................... 422/174
(58) Field of Classification Search .................. 422/174, 422/177, 180
See application file for complete search history.

(56) References Cited

U.S. PATENT DOCUMENTS

| | | | |
|---|---|---|---|
| 5,411,711 A * | 5/1995 | Swars | 422/177 |
| 5,618,462 A | 4/1997 | Swars | |
| 5,929,327 A | 7/1999 | Hafele | |
| 6,432,168 B2 | 8/2002 | Schönauer | |
| 6,562,305 B1 * | 5/2003 | Swars et al. | 422/174 |
| 2004/0206067 A1 | 10/2004 | Birkhofer et al. | |

FOREIGN PATENT DOCUMENTS

| | | |
|---|---|---|
| DE | 4301564 A1 | 7/1994 |
| DE | 4303581 A1 | 8/1994 |
| DE | 9320985 U1 | 9/1995 |
| DE | 19542038 A1 | 5/1997 |
| DE | 102005001756 A1 | 7/2006 |
| EP | 1106797 A1 | 6/2001 |
| EP | 1389268 A1 | 2/2004 |
| EP | 1389268 B1 | 2/2004 |
| WO | 9417289 A1 | 8/1994 |
| WO | 9417292 A1 | 8/1994 |
| WO | 02095199 A1 | 11/2002 |

OTHER PUBLICATIONS

European Search Report dated Feb. 2, 2010.

\* cited by examiner

*Primary Examiner* — Tom Duong
(74) *Attorney, Agent, or Firm* — Laurence A. Greenberg; Werner H. Stemer; Ralph E. Locher

(57) ABSTRACT

A device for exhaust-gas treatment includes at least one housing with an inner surface and at least one sensor foil disposed in the housing. The sensor foil is formed at least with a sensor element and a conductor element. The sensor foil is also provided with an edge up to which the conductor element extends and which bears against the inner surface of the housing. The housing also has an opening for contacting of the conductor element. The opening is surrounded on the inner surface by an electrical insulating layer.

7 Claims, 3 Drawing Sheets

EXHAUST-GAS TREATMENT DEVICE HAVING A SENSOR FOIL

CROSS-REFERENCE TO RELATED APPLICATION

This application claims the priority, under 35 U.S.C. §119, of German Patent Application DE 10 2008 051 169.2, filed Oct. 10, 2008; the prior application is herewith incorporated by reference in its entirety.

BACKGROUND OF THE INVENTION

Field of the Invention

The present invention relates to an exhaust-gas treatment device having at least one housing with an inner surface and at least one sensor foil disposed in the housing. The sensor foil is formed at least with a sensor element and a conductor element and the sensor foil is provided with an edge up to which the conductor element extends. The sensor foil is disposed in such a way that its edge bears against the inner surface of the housing. The invention can be used, in particular, in exhaust systems of diesel or spark-ignition engines in motor vehicles.

European Patent EP 1 389 268 B1, corresponding to U.S. Patent Application Publication No. US 2004/0206067, describes a sensor for monitoring and/or controlling a catalytic converter, in particular a motor vehicle catalytic converter. The basic concept of a sensor foil of that type is that, for example, a temperature sensor is in direct contact with a catalytically active coating and/or the foil. In that case, it is very particularly preferable for the sensor element to be formed in the manner of a thin layer on the metallic foil itself. That document also describes that the sensor foil must be provided with a suitable contacting facility for subsequent further processing of the signals or measurement results thereby obtained. A problem in that case can be the transmission of the signal to distant connecting devices or measuring devices.

SUMMARY OF THE INVENTION

It is accordingly an object of the invention to provide an exhaust-gas treatment device having a sensor foil, which overcomes the hereinafore-mentioned disadvantages and at least partially solves the highlighted problems of the heretofore-known devices of this general type, which especially provides a simple contacting facility wherein, in particular, it is also sought to provide more reliable production of such a device within the context of series production.

With the foregoing and other objects in view there is provided, in accordance with the invention, a device for exhaust-gas treatment. The device comprises at least one housing having an inner surface and an opening, an electrical insulating layer surrounding the opening on the inner surface, and at least one sensor foil disposed in the housing and having an edge bearing against the inner surface of the housing. The sensor foil is formed at least with a sensor element and a conductor element. The conductor element extends to the edge of the housing and the conductor element is configured to be contacted through the opening in the housing.

It should firstly be noted that, with regard to the physical embodiment of the sensor foil, and very particularly in connection with the construction of the sensor element and/or of the conductor element, reference may be made to the explanations given in European Patent EP 1 389 268 B1, corresponding to U.S. Patent Application Publication No. US 2004/0206067, in such a way that the contents of the disclosure of that document are incorporated by reference and may be taken into consideration in their entirety herein for the description of the sensor foil.

With regard to the configuration of the sensor foil in the housing, it is preferable for the sensor foil to span the cross section of the housing in a rectilinear and/or coiled fashion. In this respect, it is preferable for both edges of the sensor foil to be placed in contact with the inner surface of the housing at different locations. The at least one sensor element is accordingly situated on the surface of the sensor foil and has (in each case) at least one conductor element which extends radially outward along the sensor foil up to the edge. It is then very particularly preferable for all of the conductor elements of a sensor foil to extend to the same edge of the sensor foil. In most cases, it will suffice if the at least one conductor element (and/or even the sensor element) bears smoothly or completely against the surface of the sensor foil. In particular, in devices which are subjected to particularly high temperature differences and/or in devices in which the materials of the conductor element and of the sensor foil differ significantly in terms of thermal expansion, measures may be implemented in the configuration which enable a (partial) relative movement of the conductor element and sensor foil. It is possible, for example, for the conductor element to be only partially connected to the sensor foil and formed with a corrugation (in the plane of the sensor foil and/or transversely with respect thereto).

At least one opening for contacting of the conductor element is now provided in the housing. It is also possible for a plurality of openings to be provided in the housing, in particular in an aligned configuration, in which the openings serve for contacting of different conductor elements. It is, however, also possible for only one opening to be provided for the contacting of a plurality of conductor elements. The opening is often formed in the manner of a round hole which extends through the housing and thereby enables lateral access to the sensor foil. An electric insulating layer is now provided on the inner surface surrounding the opening. An "electric insulating layer" may, for example, be formed cohesively with the housing, although it is also possible to provide separate components in this case. In that embodiment, an insulating layer is preferable which is formed as a coating on the inner surface of the housing. The electric insulating layer preferably surrounds the region directly surrounding the opening, in such a way that, for example, an edge region with an extent of at least 2 cm, or preferably even at least 5 cm, is formed around the opening. The electric insulating layer serves, in particular, to prevent signals being transmitted from the conductor elements to the housing. This could possibly occur within the context of series production if certain tolerances could not be adhered to.

In accordance with another feature of the invention, it is very particularly preferable for the device to be constructed in such a way that a honeycomb body is formed with the at least one sensor foil. For this purpose, the sensor foil may, for example, be disposed with a multiplicity of further, at least partially structured, metal foils which are inserted, having been layered and/or stacked together, into the housing. In this case, it is preferable for the foils to be coiled or wound together with one another. Furthermore, it is very particularly preferable for the at least partially structured metallic foils and the sensor foil to be provided with substantially equal dimensions, that is to say, in particular, the foil thickness. Simple handling of the foils during the production of the honeycomb body, and integration of the honeycomb body into the housing, are thereby realized.

In accordance with a further feature of the invention, it is also preferable for the at least one conductor element to be cohesively connected, close to the edge, to an electrode which extends through the opening. The electrode serves, in particular, to pick off the signal of the conductor element. In this case, the electrode may be brazed and/or welded to the sensor foil in the region of the conductor element. In this case, the cohesive connection is formed so as to permanently withstand the ambient conditions prevailing in the exhaust system of internal combustion engines. For this purpose, it may be advantageous for the conductor element to form a widened or enlarged connecting region in the direction of the electrode in order to enable a large-area connection to the electrode.

In accordance with an added feature of the invention, in this context specifically, it is considered to be advantageous for the electrode to be electrically insulated and mounted in a sleeve which is mounted in a gas-tight fashion on an outer surface of the housing. That is to say in other words, in particular, that a metallic sleeve is disposed, for example with a gas-tight weld seam, on the outer surface and around the opening. The sleeve can be lined with insulation, and securely hold the electrode, at the inside. It is thus also ensured, in particular, that no exhaust gas passes through the sleeve to the outside.

In accordance with an additional feature of the invention, it is also preferable in this case for at least the electrode or the sleeve to be directly connected to a connecting plug. In this case, the connecting plug may, for example, also be fastened directly to the electrode and to the sleeve. In this case, it is necessary in particular to select measures for a reduced transfer of heat to the connecting plug, and/or suitable materials with regard to the temperature loading of the connecting plug. The connecting plug serves, in particular, for the detachable fastening of a flexible conductor, that is to say for example a cable.

In accordance with yet another feature of the invention, it is also proposed that the at least one sensor foil be brazed or soldered in the housing. In this case, consideration is given in particular to a brazed connection. In some cases, it may also be expedient to at least partially weld the sensor foil to the housing.

In accordance with yet a further feature of the invention, specifically in the structural variant with a brazed connection of the sensor foil to the housing or of the foils of the honeycomb body to one another, it is advantageous for the electric insulating layer which is provided on the inner surface of the housing around the opening to be formed with a material which cannot be brazed. That is to say in other words that the insulating layer may then also be formed as a passivation layer for a brazed connection. For this purpose, rough surfaces and/or layers with aluminum oxide are particularly preferable.

In accordance with yet an added feature of the invention, it is also proposed that the at least one conductor element be formed at least partially with a protective coating. The protective coating serves, in particular, to electrically insulate the conductor element with respect to the adjacent metallic foils, and/or to prevent abrasion. This applies, in particular, if the conductor element is applied to the foil through the use of a printing process.

In accordance with a concomitant feature of the invention, it is likewise provided that those metallic foils which are situated opposite or adjacent the at least one (exposed) sensor element are formed with at least one recess and/or a structure reduction, in such a way that the spacing of the metallic foils to the sensor foil in the region of the at least one sensor element is (locally) enlarged. This serves, in particular, to prevent the at least one sensor element and/or the (catalytic) coating which is situated thereon from making contact with or even being abraded by the metallic foil. In this way, the measurement accuracy and reliability of the information obtained is also maintained over a long operating period.

Other features which are considered as characteristic for the invention are set forth in the appended claims, noting that the features specified individually in the claims may be combined with one another in any desired technologically expedient manner and form further embodiments of the invention.

Although the invention is illustrated and described herein as embodied in an exhaust-gas treatment device having a sensor foil, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
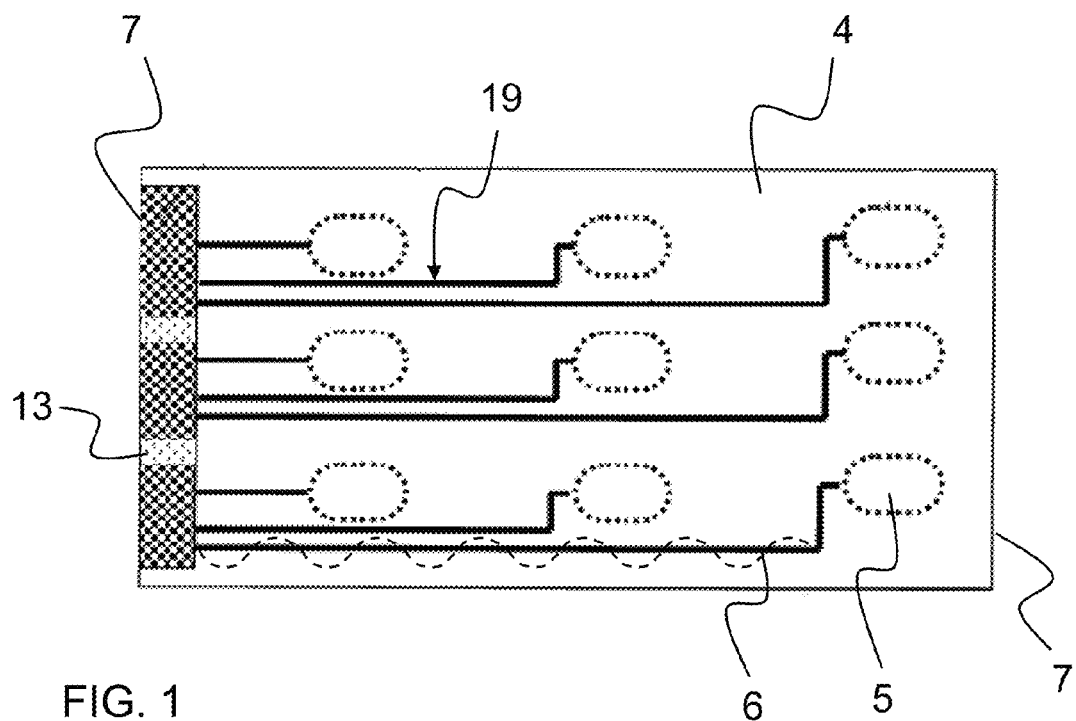
FIG. 1 is a diagrammatic, plan view of a sensor foil.

Referring now in detail to the figures of the drawings, which show particularly preferred structural variants, to which the invention is, however, not restricted, and first, particularly, to FIG. 1 thereof, there is seen a sensor foil 4 in a plan view and in an extended configuration. The sensor foil 4 includes a multiplicity of sensor elements 5 which are disposed in this case in horizontal lines and in vertical rows. Each sensor element 5 is formed in this case with a separate conductor element 6. Proceeding from the sensor element 5, the conductor element 6 extends up to an edge 7 (illustrated at the left side of the figure) of the sensor foil 4. The conductor elements 6 of one row of the sensor elements 5 are merged in the region of the edge 7. In order to delimit the grouped conductor elements 6, an electrical insulating device 13, in this case for example in the form of a coating, is formed in each case between the respective conductor elements 6. Reference is made to the contents of European Patent EP 1 389 268 B1, corresponding to U.S. Patent Application Publication No. US 2004/0206067 for a more detailed description of this type of sensor elements, of conductor elements and of the application or integration of the sensor element and/or conductor element onto or into the metallic support foil. In addition, the conductor elements 6 may, for example, be applied to the sensor foil 4 in the manner of a coating or an applied layer, and be covered by a protective coating 19 for protection during operation. It is also indicated herein, through the use of a dashed line, that the conductor element 6 may be only partially connected to the sensor foil 4 and formed with a corrugation (in the plane of the sensor foil 4) in order to compensate for different thermal expansion characteristics.

Figure 2:
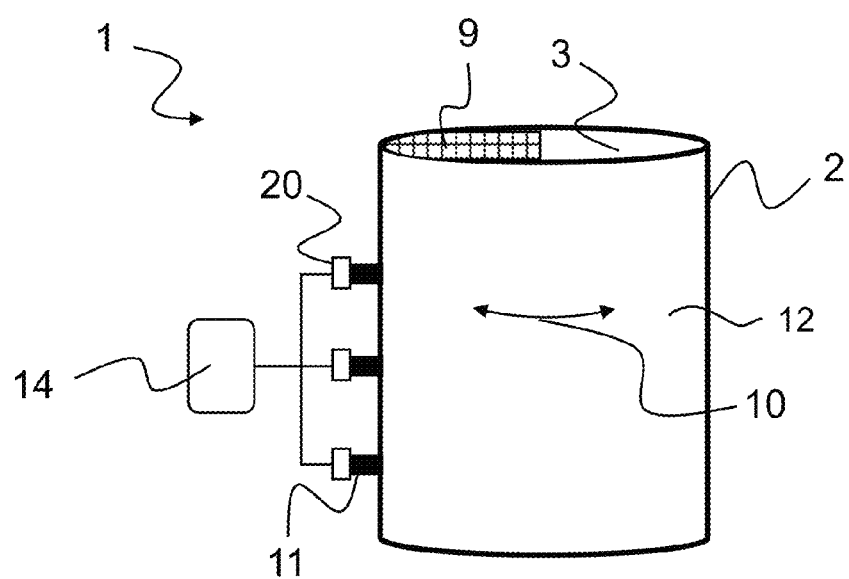
FIG. 2 is a perspective view of a first structural variant of the device.

FIG. 2 shows a structural variant of an exhaust-gas treatment device 1. The device 1 has a housing 2, in this case having a cylindrical construction, which may be described by an inner surface 3 and an outer surface 12. It is likewise indicated herein that a honeycomb body 9 is formed in the interior of the housing 2 so as to bear against the inner surface 3.

In order to transmit information and signals generated in the sensor elements 5 or the sensor foil 4 to a measurement unit 14 (for example an engine controller), the housing 2 has a multiplicity of electrodes 11 which extend into inner regions of the housing 2 and are connected, in particular cohesively brazed or welded, to the conductor elements 6 of the sensor foil 4. In the structural variant shown herein, one connecting plug 20 is provided directly on each respective electrode 11. The signal transmission takes place from the connecting plug 20 through a cable to the measurement unit 14. In this case, the electrodes 11 are disposed in alignment in a row, but this is not imperative. The electrodes 11 may also be distributed about the circumference 10 of the housing 2.

Figure 3:
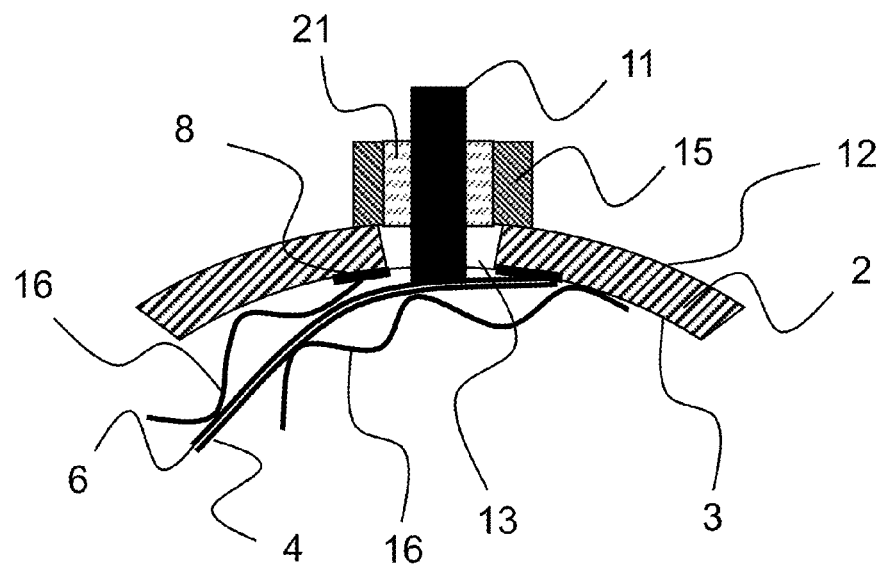
FIG. 3 is an enlarged, fragmentary, cross-sectional view of a structural variant of the device.

FIG. 3 shows a portion of a structural variant of the device in cross section. The figure illustrates the housing 2 with an opening 13 through which the electrode 11 extends. Two corrugated metal foils 16 are shown in the interior of the housing 2 and a smooth sensor foil 4 is disposed between the metal foils 16. A conductor element 6, which is shown on the sensor foil 4, extends up to the edge. The sensor foil 4, like all of the other foils, bears with its edge against the inner surface 3 of the housing 2. In this case, the electrode 11 extends in a fixed manner through a sleeve 15 which is welded in a gas-tight manner to the outer surface 12 of the housing 2, with insulation 21 being provided between the sleeve 15, which is generally composed of metal, and the electrode 11. An electric insulating layer 8 is also provided on the inner surface 3 around the opening 13. The aim of the electric insulating layer 8 is to ensure that signals are transmitted only through the electrodes 11, even in different installation situations of the metal foils 16 and of the sensor foil 14 in relation to the opening 13.

Figure 4:
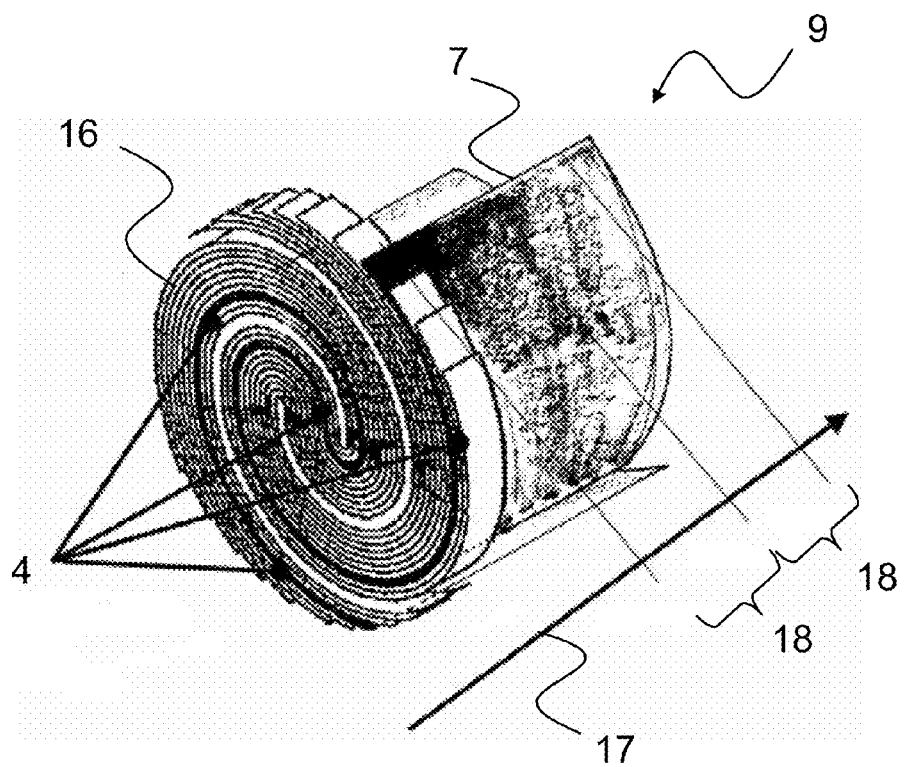
FIG. 4 is a perspective view of a structural variant of a honeycomb body for a corresponding device.

FIG. 4 diagrammatically shows a honeycomb body 9 which can be integrated in the above-described housing 2. In this case, the honeycomb body 9 is formed with a sensor foil 4 which is wound in an s-shape, and a multiplicity of smooth and corrugated metal foils 16. It is also possible for separate items of information relating to different portions 18 of the device to be obtained during operation in an exhaust system, through the use of a configuration of the sensor elements 5. The configuration is offset in an (axial) direction of extent 17, for example, as shown in FIG. 1. In addition, the adjacent metal foils 16 may have cutouts, impressions and/or separate coatings in the region of the sensor elements 5 of the sensor foil 4 in order to compensate for the elevated sensor elements, and/or to enable simple contacting of the sensor elements 5 with the exhaust gas.

Figure 5:
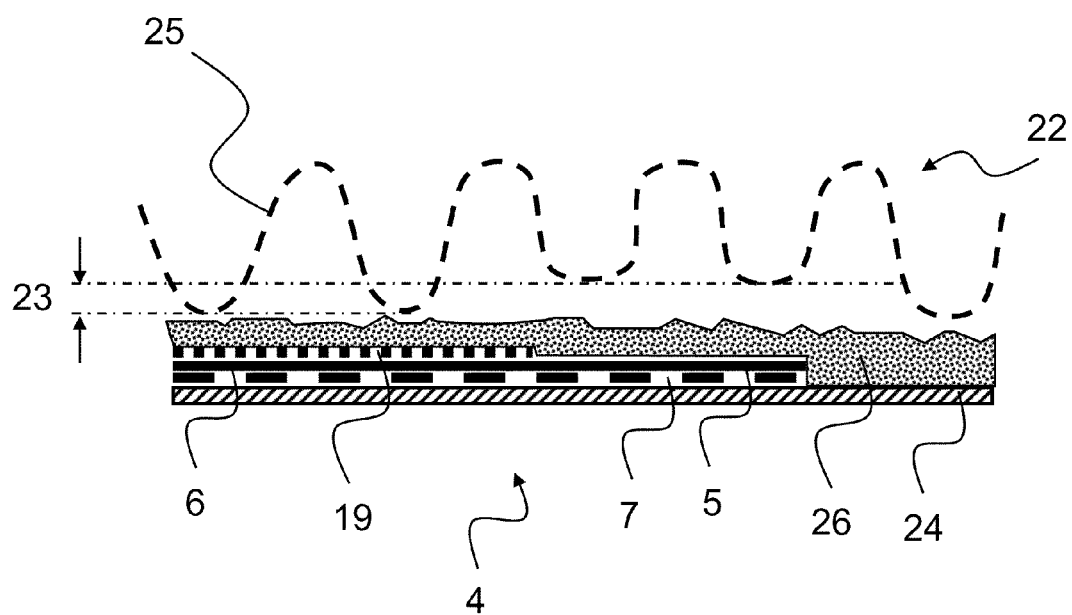
FIG. 5 is an enlarged, fragmentary, cross-sectional view of a further structural variant of a honeycomb body.

FIG. 5 diagrammatically shows a portion of a further exemplary embodiment in cross section. Illustrated (in dashed lines) are a corrugated layer 25 (metallic foil) with a structure 22 and a smooth layer 24 (metallic foil) which, together, form passages in the honeycomb body. The smooth layer firstly has an insulating layer 27 formed thereon to which the conductor element 6 is applied. The conductor element 6 is in turn covered by a protective coating 19 which extends up to the sensor element 5 but does not cover the latter. A washcoat 26 (if appropriate provided with catalytically active substances) is now applied over the smooth layer 24 and also over the corrugated layer 25. The sensor element 5 is thereby in direct contact with the washcoat 26. A smooth layer 24 of this type having the sensor element 5, likewise constitutes a sensor foil 4.

In order to prevent the corrugated layer 25 or the structure 22 thereof from influencing and/or abrading the washcoat 26 which is situated on the sensor element 5, a structure reduction 23 is provided opposite the sensor element 5, in such a way that a spacing between the smooth layer 24 and the corrugated layer 25 is increased. In this case, a cohesive connection should be provided at regular intervals between the corrugated layer 25 and the smooth layer 24 (for example through the use of brazing, diffusion and/or welding) and both layers should be coated with washcoat 26.

The invention can be used, in particular, in devices in the form of catalytic converter elements, particle separators, adsorbers and the like. Those devices are usually installed in exhaust systems of internal combustion engines, in particular of motor vehicles.

The invention claimed is:

1. A device for exhaust-gas treatment, the device comprising:
   at least one housing having an inner surface and an opening;
   an electrical insulating layer surrounding said opening on said inner surface;
   an electrode extending through said opening; and
   at least one sensor foil disposed in said housing and having an edge bearing against said inner surface of said housing, said sensor foil being formed at least with a sensor element and a conductor element, said conductor element extending to said edge of said housing, said conductor element configured to be contacted through said opening in said housing, and said conductor element being cohesively connected to said electrode close to said edge.

2. The device according to claim 1, wherein said at least one sensor foil forms a honeycomb body.

3. The device according to claim 1, wherein said housing has an outer surface, a sleeve is gas-tightly mounted on said outer surface, and said electrode is mounted in an electrically insulated manner in said sleeve.

4. The device according to claim 3, which further comprises a connecting plug to which at least one of said electrode or said sleeve is directly connected.

5. The device according to claim 1, wherein said at least one sensor foil is brazed to said housing.

6. The device according to claim 5, wherein said electric insulating layer, disposed on said inner surface of said housing around said opening, is formed with a material which cannot be brazed.

7. The device according to claim 1, wherein said at least one conductor element is formed at least partially with a protective coating.

* * * * *